(12) United States Patent
Bentley

(10) Patent No.: US 9,609,448 B2
(45) Date of Patent: Mar. 28, 2017

(54) SYSTEM AND METHOD FOR TESTING AND CERTIFICATION OF MEDIA DEVICES FOR USE WITHIN A CONNECTED MEDIA ENVIRONMENT

(71) Applicant: SPOTIFY AB, Stockholm (SE)

(72) Inventor: Trevor Bentley, Stockholm (SE)

(73) Assignee: SPOTIFY AB (SE)

( * ) Notice: Subject to any disclaimer, the term of this patent is extended or adjusted under 35 U.S.C. 154(b) by 95 days.

(21) Appl. No.: 14/586,767

(22) Filed: Dec. 30, 2014

(65) Prior Publication Data
US 2016/0192096 A1    Jun. 30, 2016

(51) Int. Cl.
*G06F 17/00* (2006.01)
*H04R 29/00* (2006.01)
*H04N 17/00* (2006.01)

(52) U.S. Cl.
CPC ......... *H04R 29/001* (2013.01); *H04R 29/007* (2013.01); *H04N 17/004* (2013.01); *H04R 2499/11* (2013.01)

(58) Field of Classification Search
CPC .... H04N 17/004; H04R 29/00; H04R 29/001; H04R 29/002; H04R 29/003; G01R 31/2825
See application file for complete search history.

(56) References Cited

U.S. PATENT DOCUMENTS

| 5,088,033 A * | 2/1992 | Binkley ................ G06F 13/105 703/24 |
| 5,969,835 A | 10/1999 | Kamieniecki et al. |
| 8,639,369 B1 * | 1/2014 | Clark ...................... G10L 25/69 700/94 |

(Continued)

FOREIGN PATENT DOCUMENTS

| EP | 2501140 A1 | 9/2012 |
| WO | 2012088107 A1 | 6/2012 |

OTHER PUBLICATIONS

International Search Report and Written Opinion issued by WIPO for International Application No. PCT/EP2015/081025, dated May 4, 2016, 4 pages.

(Continued)

*Primary Examiner* — Andrew C Flanders
(74) *Attorney, Agent, or Firm* — Tucker Ellis LLP

(57) ABSTRACT

In accordance with an embodiment, described herein is a system and method for testing and certification of media devices for use within a connected media environment. A testing device includes an input mechanism, for example a microphone, and a plurality of test files. Each test file can be used to produce a characteristic signal, for example an audio track having a particular frequency. The testing device emulates a gateway between a media device under test, such as an audio speaker, and a media server. Test scripts can be used to mimic commands to play or otherwise access media content at the device under test. Playback of a particular test file can be detected and recognized according to the characteristic signal produced by that test file. Resultant test information can be used to evaluate the performance and/or certify operation of the media device within the connected media environment.

20 Claims, 8 Drawing Sheets

(56) References Cited

U.S. PATENT DOCUMENTS

| | | | |
|---|---|---|---|
| 2003/0092394 A1* | 5/2003 | Gray | H04M 3/2236 |
| | | | 455/67.14 |
| 2004/0223620 A1* | 11/2004 | Horbach | H04R 29/002 |
| | | | 381/59 |
| 2006/0212769 A1* | 9/2006 | Saito | G06F 11/3672 |
| | | | 714/741 |
| 2007/0255437 A1* | 11/2007 | Vernon | H04R 29/00 |
| | | | 700/94 |
| 2008/0036865 A1 | 2/2008 | Liu | |
| 2009/0225993 A1* | 9/2009 | Cvetkovic | H04R 1/403 |
| | | | 381/26 |
| 2011/0001833 A1 | 1/2011 | Grinkemeyer et al. | |
| 2012/0050545 A1 | 3/2012 | Pham et al. | |
| 2012/0050546 A1 | 3/2012 | Pham | |
| 2012/0143606 A1 | 6/2012 | Pham | |
| 2013/0022210 A1* | 1/2013 | Vainiala | G10H 1/16 |
| | | | 381/59 |
| 2013/0156213 A1* | 6/2013 | Pan | G10K 11/1788 |
| | | | 381/71.4 |
| 2013/0188795 A1* | 7/2013 | Quan | H04R 29/00 |
| | | | 381/58 |
| 2013/0339807 A1 | 12/2013 | Umeroglu et al. | |
| 2015/0078596 A1* | 3/2015 | Sprogis | H04R 5/027 |
| | | | 381/303 |

OTHER PUBLICATIONS

'Samsung Shape Wireless Audio-Multiroom System Now Playing 'Spotify Connect,' Samsung U.S. News, Jun. 5, 2014, http://www.samsung.com/us/news/23267, 2 pages.
Communication pursuant to Article 94(3) EPC issued by the European Patent Office for EP Application No. 15 820 151.7, dated Nov. 8, 2016, 4 pages.

* cited by examiner

SYSTEM AND METHOD FOR TESTING AND CERTIFICATION OF MEDIA DEVICES FOR USE WITHIN A CONNECTED MEDIA ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing media content, for example music or video content, and are particularly related to a system and method for testing and certification of audio speakers or other types of media devices, for use within a connected media environment.

BACKGROUND

Today's consumers enjoy the ability to access a tremendous amount of media content, such as music and videos, at any location or time of day, using a wide variety of media devices. With the availability of reliable high-speed Internet connectivity, and advances in digital rights management, users can stream media content, on demand, from peer devices or remote media servers.

A connected media environment allows users to select which of several media devices should be used to play a particular media content. For example, a user may wish to stream a selected song to a particular audio speaker, or stream a selected movie to a particular television. To provide an optimal user experience, such media devices must operate satisfactorily within the connected media environment. These are some examples of the types of environments in which embodiments of the invention can be used.

SUMMARY

In accordance with an embodiment, described herein is a system and method for testing and certification of media devices for use within a connected media environment. A testing device includes an input mechanism, for example a microphone, and a plurality of test files. Each test file can be used to produce a characteristic signal, for example an audio track having a particular frequency. The testing device emulates a media gateway between a media device under test, such as an audio speaker, and a media server. Test scripts can be used to mimic commands to play or otherwise access media content at the device under test. Playback of a particular test file can be detected and recognized according to the characteristic signal produced by that test file. Resultant test information can be used to evaluate the performance and/or certify operation of the media device within the connected media environment.

In accordance with an embodiment, a testing device can be provided at a particular site, for use in testing media devices at that site, and reporting the results of such testing either locally, or alternatively via a network to a remote location or certification provider, for remote testing and certification of the media devices.

DETAILED DESCRIPTION

Figure 1:
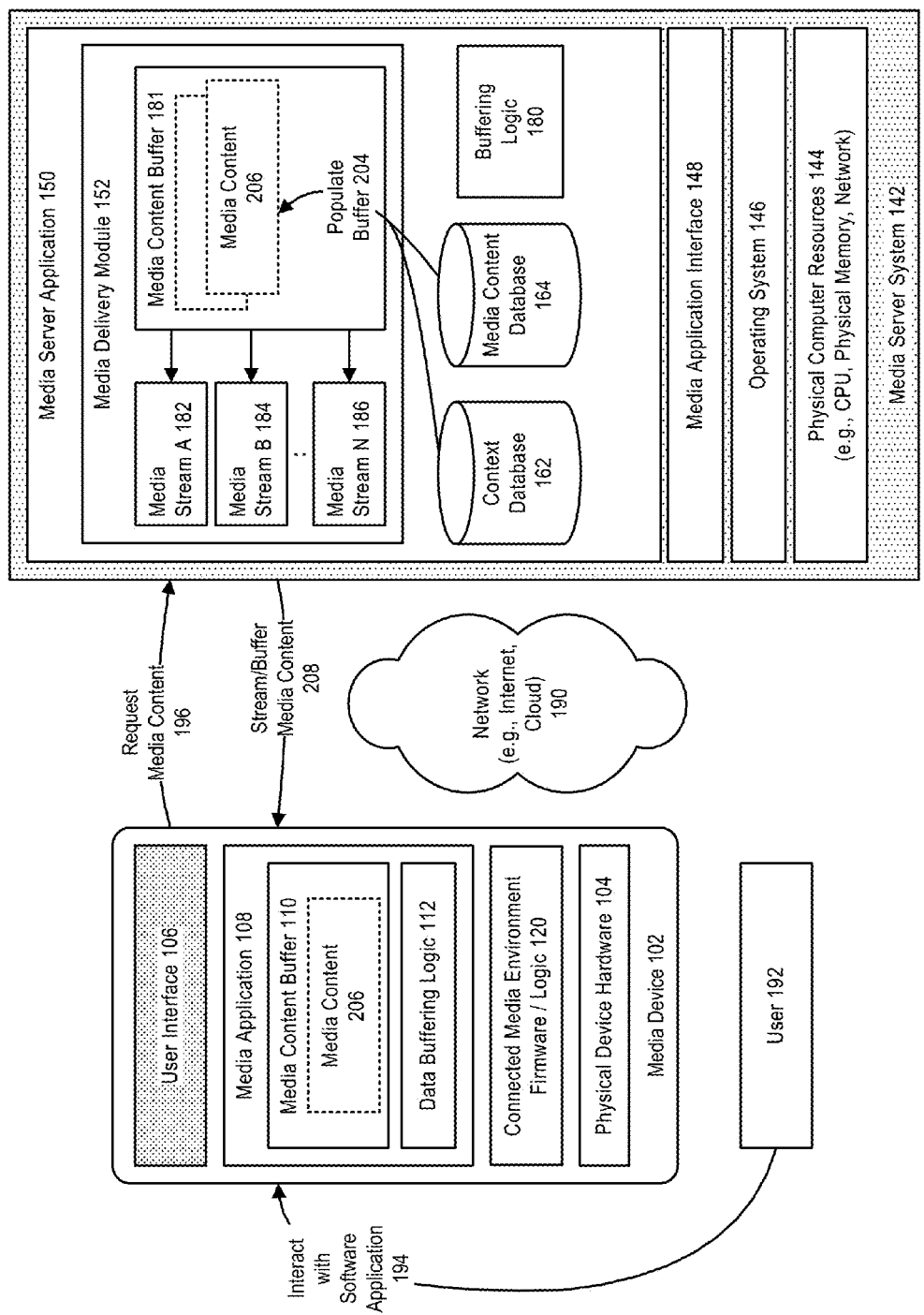
FIG. 1 illustrates an example of a media environment, in accordance with an embodiment.

As described above, a connected media environment allows users to select which of several media devices, for example which personal computer system, handheld entertainment device, tablet device, smart phone, television, audio speaker, in-car entertainment system, or other type of media device, should be used to play a particular media content. For example, a user may wish to stream a selected song to a particular audio speaker device, or stream a selected movie to a particular television device.

In some connected media environments, the user can control playback of media content at one media device, for example an audio speaker or television, using another media device, for example a smart phone. Each media device can be associated with an account which allows a backend media server to recognize devices as potential destinations for streaming media content. A user command or request to access media content can be associated with an appropriate destination at which that media content should be accessed.

For example, a smart phone can be used to send a "next song" command to the media server, to be played at a destination audio speaker. The media server can then stream the corresponding song to that audio speaker. Commands can be similarly used to, for example, pause, replay, skip, or otherwise control access to media content by the destination device.

An example of a connected media environment is the "Spotify Connect" environment, which is generally used herein as an illustrative example, although the features and techniques described herein can also be used with other types of connected media environment.

To provide an optimal user experience within a connected media environment, media devices must operate satisfactorily within the environment. To address this, the operation of each media device should preferably be examined during its product development to ensure that the device will operate or respond as expected within the environment. For example, when a user selects a song to be played at a destination device, such playback should happen quickly and with minimal noticeable interruption.

The examination of a media device's suitability can be provided using manual or subjective means. For example, a human tester can perform a series of commands with a destination device, such as playing or skipping through selected media content, and then make a determination, based on their perception, as to whether each command was successfully completed at the device.

However, such methods are generally slow, labor-intensive, subjective in nature, and limited in the type of data they can provide. Additionally, device firmware and other characteristics can change regularly, requiring a retest and yet another round of labor-intensive tasks.

In accordance with an embodiment, described herein is a system and method for testing and certification of media devices for use within a connected media environment. A testing device includes an input mechanism, for example a microphone, and a plurality of test files. Each test file can be used to produce a characteristic signal, for example an audio track having a particular frequency. The testing device emulates a media gateway between a media device under test, such as an audio speaker, and a media server. Test scripts can be used to mimic commands to play or otherwise access media content at the device under test. Playback of a particular test file can be detected and recognized according to the characteristic signal produced by that test file. Resultant test information can be used to evaluate the performance and/or certify operation of the media device within the connected media environment.

For example, the resultant information can be used to create a report or scorecard describing the media device's responsiveness to commands such as, e.g., start playing an audio track, skip to next track, change playback volume, etc.

In accordance with an embodiment, a testing device can be provided at a particular site, for use in testing media devices at that site, and reporting the results of such testing either locally, or alternatively via a network to a remote location or certification provider, for remote testing and certification of the media devices.

Media Environment

FIG. 1 illustrates an example of a media environment, in accordance with an embodiment.

As shown in FIG. 1, in accordance with an embodiment, a media device 102, acting as a client device, can receive and play media content provided by a backend media server system 142 (media server), or by another system or peer device. In accordance with an embodiment, the client device can be, for example, a personal computer system, handheld entertainment device, tablet device, smart phone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and a single media server is shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media item or stream of media content.

In accordance with an embodiment, the client device can include a media application 108, together with an in-memory media content buffer 110, and a data buffering logic 112, which can be used to control the playback of media content received from the media server, for playing either at a requesting client device (i.e., controlling device) or at a controlled client device (i.e., controlled device), in the manner of a remote control. A connected media environment firmware or logic 120 enables the device to participate within a connected media environment.

In accordance with an embodiment, the data buffering logic, together with the media content buffer, enables a portion of media items, or samples thereof, to be pre-buffered at a client device.

For example, while media options are being prepared for display on a user interface as, e.g., media tiles or thumbnails, their related media content can be pre-buffered at the same time, and cached by one or more client devices in their media content buffers, for prompt and efficient playback when required.

In accordance with an embodiment, the media server can include an operating system 146 or other processing environment which supports execution of a media server application 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server.

A received media-access request from a client device can include information, for example a network address, which identifies a destination client device to which the media server should stream or otherwise provide media content, in response to processing the media-access request.

For example, a user may own several client devices, such as a smart phone and an audio speaker, which can present media content received from a media server. In accordance with an embodiment, identifying information provided with a media-access request can include an identifier, such as an IP address, MAC address, or device name, which identifies that the media-access request is intended for use with a particular destination device.

This allows a user, for example, to use their smart phone as a controlling client device, and their audio speaker as a controlled client device to which media content should be sent. The media server can then send the requested media and/or forward the media-access request to the audio speaker, even though the request originated at the user's smart phone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. In accordance with an embodiment, the context database can be used to store a media device's current media state at the media server, and synchronize that state between devices, in a cloud-like manner. Alternatively, in accordance with an embodiment, media state can be shared in a peer-to-peer manner, wherein each device is aware of its own current media state which is then synchronized with other devices as needed.

For example, in accordance with an embodiment, when the destination client device to which the media content is being streamed changes from a controlling device to a controlled device, or from a first controlled device to a second controlled device, then the media server system can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media items.

In accordance with an embodiment, a buffering logic 180 can be used to retrieve or otherwise access media items or content, in response to requests from client devices or other systems, and to populate a media content buffer 181, at a media delivery module 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. A user 192 can interact 194 with the user interface at a client device, and issue requests to access media content, for example the playing of a selected music or video item at their client device or at a controlled device, or the streaming of a media channel or video stream to their client device or to a controlled device.

For example, in accordance with an embodiment, the user's selection of a particular media option can be communicated 196 to the media server, via the server's media application interface. The media server can populate its media content buffer at the server 204, with corresponding media content, 206 including one or more streams of media content data. The media server can then communicate 208 the selected media content to the user's client device, or to the controlled device as appropriate, where it can be buffered in a media content buffer for playing at the device.

Media Playback within a Connected Media Environment

Figure 2:
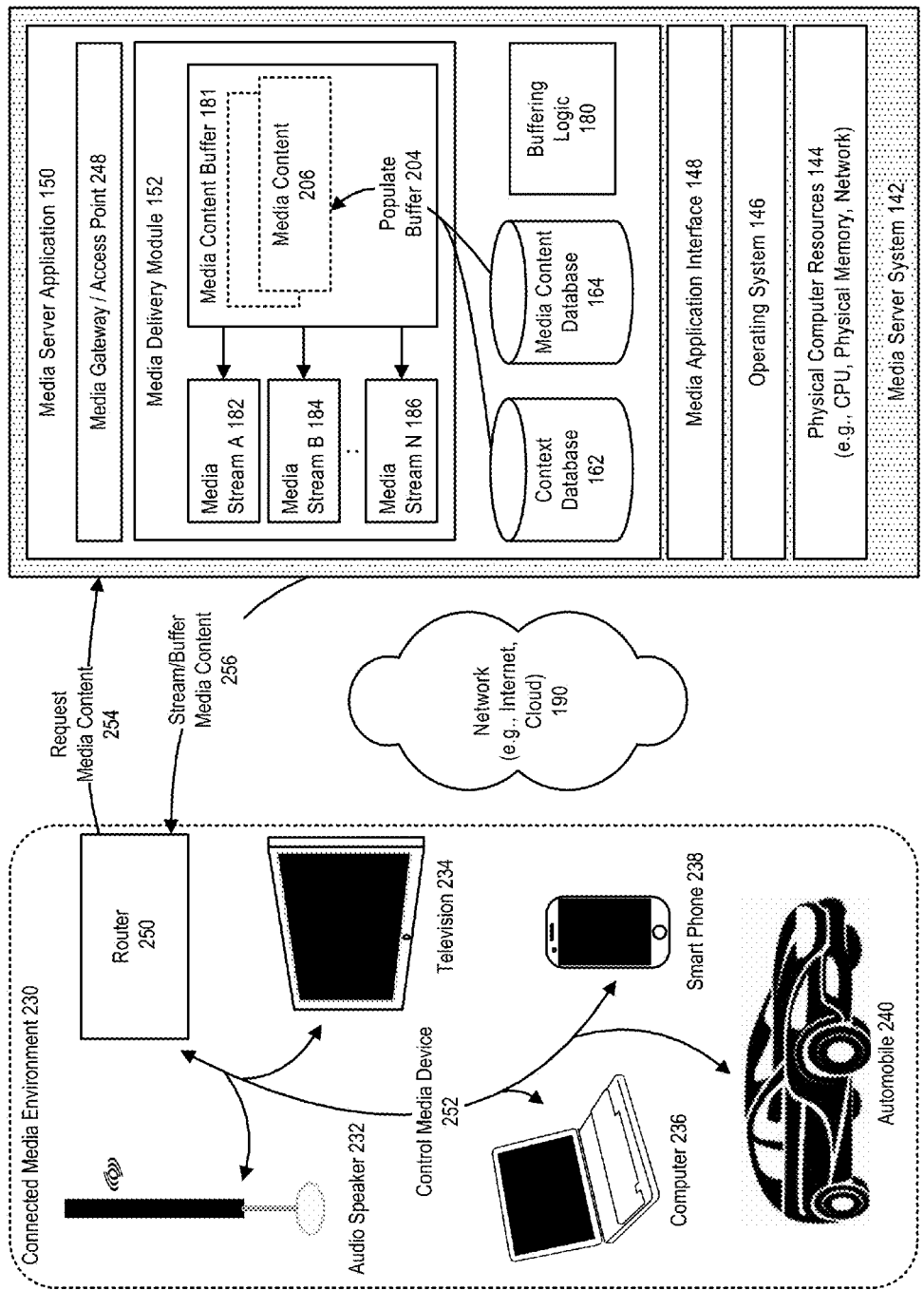
FIG. 2 illustrates an example of a connected media environment, in accordance with an embodiment.

FIG. 2 illustrates an example of a connected media environment, in accordance with an embodiment.

As shown in FIG. 2, in accordance with an embodiment, a connected media environment 230, for example a Spotify Connect environment, enables communication between a client device within the connected media environment and a server-side media gateway or access point 248, including optionally use of a router 250.

Examples of the types of media device that can be provided within a connected media environment include audio speakers 232, televisions 234, computers 236, smart phones 238, and in-car entertainment systems 240, or other types of media device.

In accordance with an embodiment, a client device having an application user interface can act as a controlling client device to control 252 the playback of media content at a controlled device. In accordance with an embodiment, a client device can itself act as a media gateway, for use by other devices within the connected media environment.

In accordance with en embodiment, a controlled device can also include a media application, which in the case of an audio speaker, television or similar device can be included within the device itself as firmware logic, or within, e.g., a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, a user can request that media content be buffered, streamed or received and played at a controlling client device such as a smart phone, and simultaneously buffered, streamed or received for playing at one or more controlled devices, such as an audio speaker.

Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
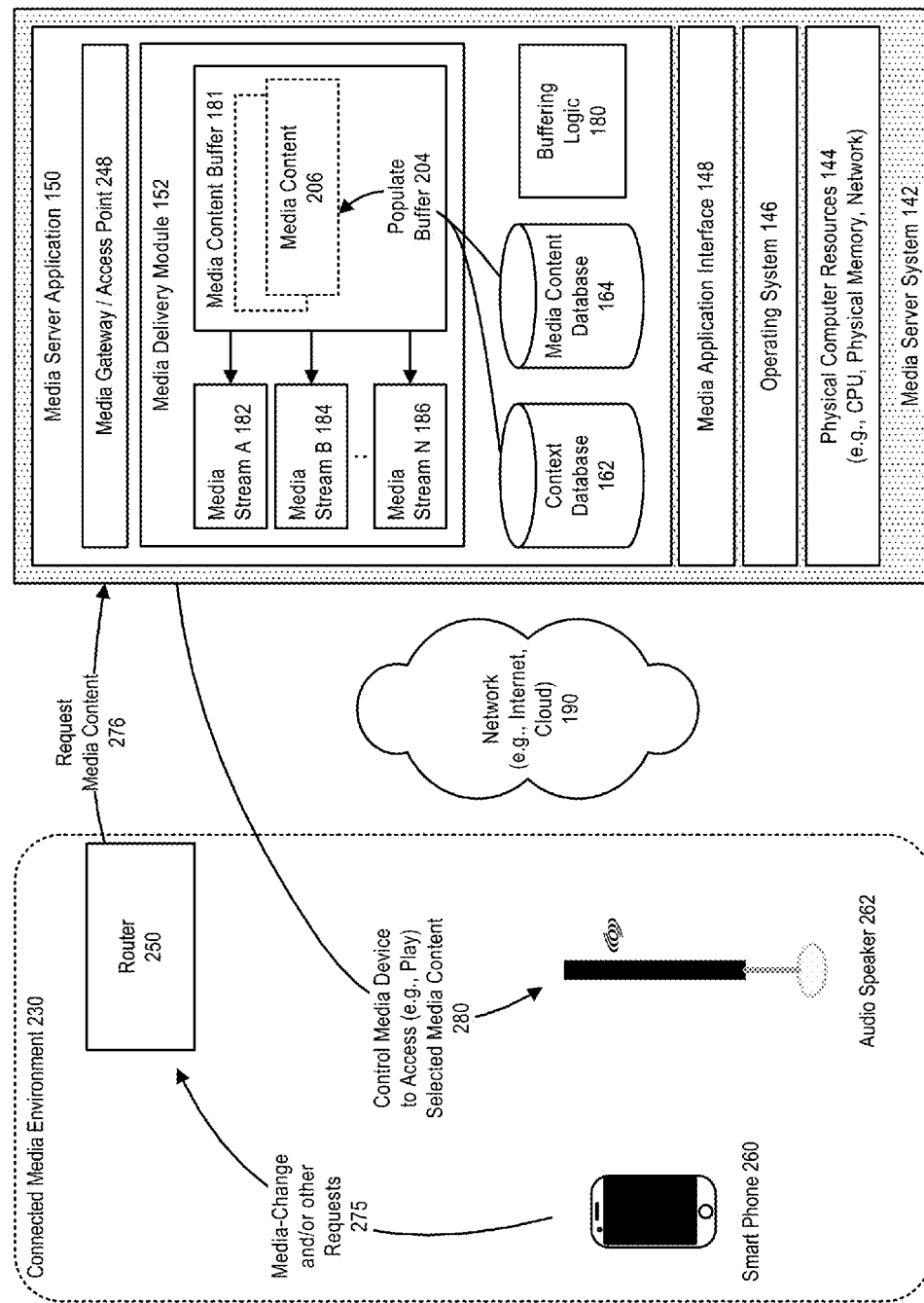
FIG. 3 further illustrates an example of a connected media environment, in accordance with an embodiment.

FIG. 3 further illustrates an example of a connected media environment, in accordance with an embodiment.

As shown in FIG. 3, a user can utilize, for example, a smart phone 260 in combination with an audio speaker 262, to issue a media-change request 275 from the smart phone, for example, to change a media channel at the audio speaker.

The request can be received by the media gateway and communicated to the media server as a request for media content 276, which can then respond by controlling the destination device (in this example, the audio speaker) to access (e.g., play) the selected media content 280.

Certification of Media Devices within a Connected Media Environment

As described above, to provide an optimal user experience within a connected media environment, the operation of each media device should preferably be examined during its product development to ensure that the device will operate or respond as expected within the environment.

Figure 4:
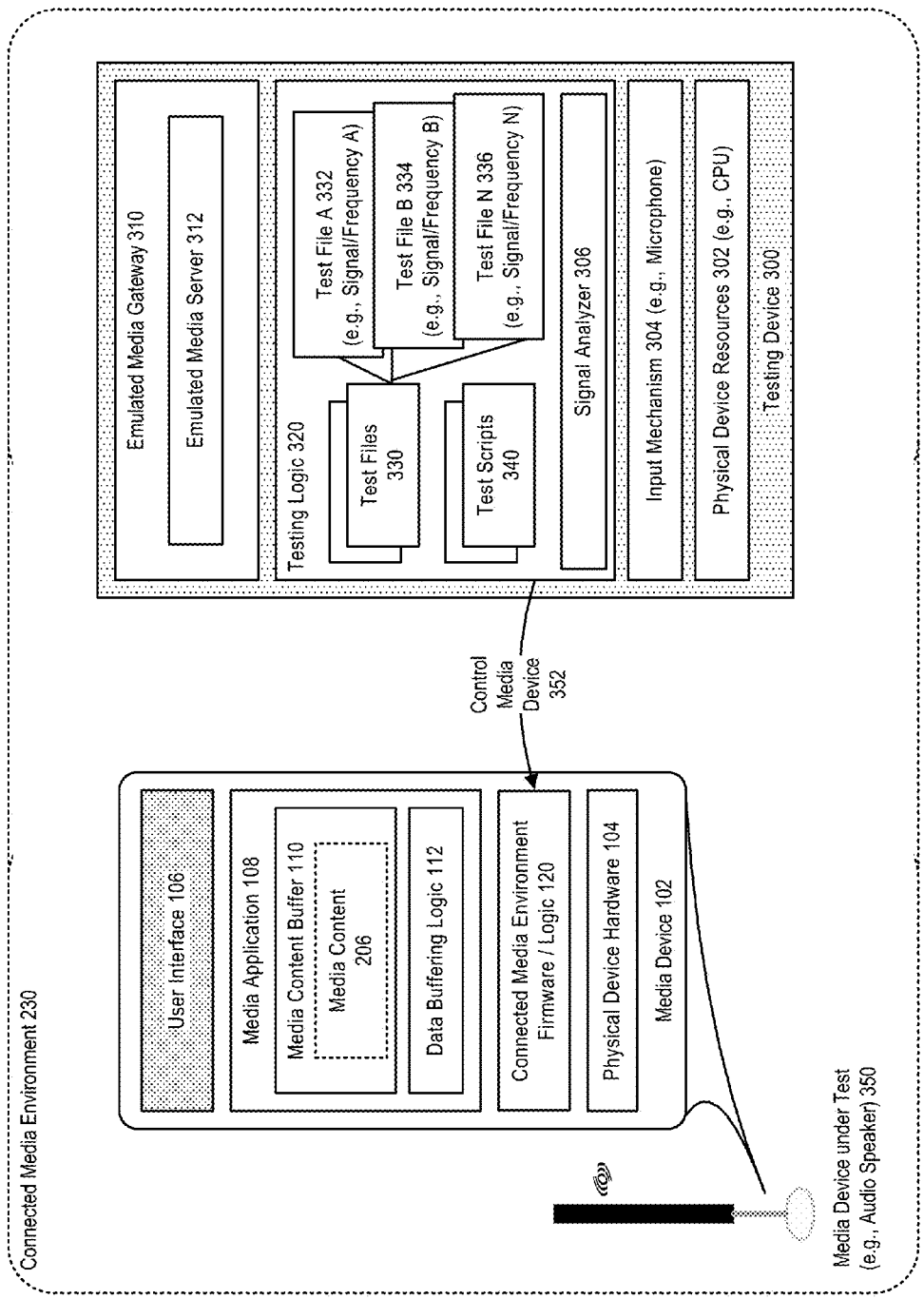
FIG. 4 illustrates a system including a testing device, for testing and certification of media devices for use within a connected media environment, in accordance with an embodiment.

FIG. 4 illustrates a system including a testing device, for testing and certification of media devices for use within a connected media environment, in accordance with an embodiment.

As shown in FIG. 4, in accordance with an embodiment, a testing device 300 can include physical device resources 302, such as one or more processors (CPU), physical memory, network components, or other types of hardware resources, an input mechanism 304, a testing logic 320, and a plurality of test files 330. In accordance with an embodiment, the input mechanism can be a microphone.

In accordance with an embodiment, each of the plurality of test files (for example, test files A 332, B 334, N 336) can be used to produce a characteristic signal, for example playback of an audio track having a particular frequency.

In accordance with an embodiment, the testing device emulates a media gateway 310 having an emulated media server 312, between a media device under test 350, such as an audio speaker, and a media server. The emulated media server can provide a similar functionality as a (regular) media server as described above, within the context of the emulated media gateway, including support for accessing media content.

In accordance with an embodiment, test scripts 340 can be used to control 352 or mimic commands from the media device to play or otherwise access media content associated with the test files. Playback of a particular test file can be detected and recognized, for example using a signal analyzer 306, according to the characteristic signal produced by that test file.

Figure 5:
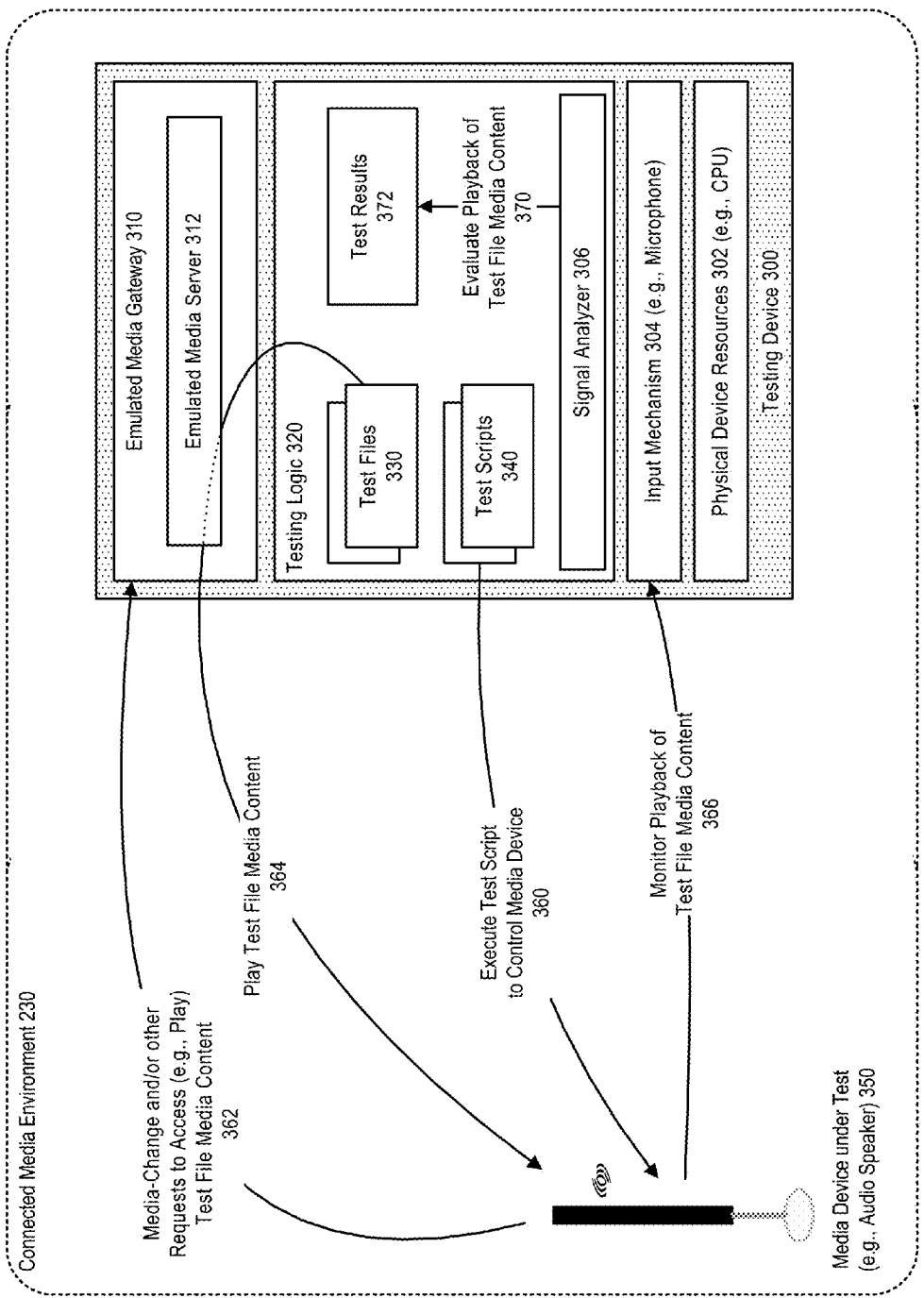
FIG. 5 further illustrates a system for testing and certification of media devices, in accordance with an embodiment.

FIG. 5 further illustrates a system for testing and certification of media devices, in accordance with an embodiment.

As shown in FIG. 5, in accordance with an embodiment, a test script can be executed to control playback at a media device e.g., an audio speaker 360, for example to make media-change and/or other requests 362 to access the test file media content. The request is intercepted by the emulated media gateway, which, together with its emulated media server causes a corresponding test file media content to be played 364 at the destination device, in this example the audio speaker.

In accordance with an embodiment, tests for use within a music/song environment can include commands such as loading an audio track; pushing a playlist; skipping to a next track; skipping to a previous track; seeking within a track; changing playback volume; pausing playback; and resuming from a paused playback. Tests for use within other types of media environment can include different types of commands.

In accordance with an embodiment, playback of the test file media content can be monitored 366 by the input mechanism, and the resultant information used to evaluate playback of the test file media content 370, and provide test results 372 for the media device under test.

For example, in accordance with an embodiment, a microphone can be used to record audio output from a speaker under test, and provide the audio output to a frequency analyzer which determines its frequency. A testing script can issue commands to play tracks, each associated with a particular audio frequency, so that when a test command is processed to, e.g., click on a next track, the output frequency should change correspondingly. The microphone can monitor the changed output, and the testing logic can determine whether the speaker is indeed playing the expected correct track, or whether there is any delay in playing that track.

Such information can be used to determine the responsiveness of the device under test to the test commands, which in turn provides an indication of the device's suitability for use within the connected media environment.

In accordance with an exemplary embodiment, the testing device can be implemented as a self-contained computer, such as a Raspberry Pi unit, including a microphone, wireless router capability, and appropriate emulated media gateway and testing logic. Each test file can be used to play an audio track that is a sine wave of a particular frequency.

During a test, the testing device can be positioned in front of an audio speaker to be tested, within a reasonably silent room or enclosure. The audio speaker can be paired with the wireless network enabled by the testing device, which is configured to act as a gateway to a connected media environment, for example a Spotify Connect environment, including support for features such as user authentication, and track selection.

The emulated media gateway can intercept media-access requests that are intended for, in this example, a Spotify media server. The testing device can then control the audio speaker, requesting it to execute a series of test commands. A signal analysis can be performed on played/output sounds to determine the response of the audio speaker to the media-access requests. The resultant information can be used to create a report or scorecard describing the audio speaker's responsiveness to commands such as, e.g., start playing an audio track, skip to next track, change playback volume, etc.

In accordance with an embodiment, test results can be provided by means of a user interface either at the testing device itself or, for example, by means of a web page that is accessible at the testing device. Each set of test results can include data such as the type and number of tests run, including the number of times each command/action was run, with median, mode, and standard deviations.

Test results can also be returned to a device manufacturer, and compared with pre-defined limits, to determine a pass/fail for the device, and/or whether the device can be certified for use within a connected media environment.

In accordance with an embodiment, each media device which is intended to be used with the connected media environment can include a firmware, including a connected media environment firmware or logic 120 that enables the device to participate within the environment.

For example, in a Spotify Connect environment, each device can include within its media environment firmware or logic a Spotify library that supports Spotify-understood tasks such as downloading music from Spotify, or processing Spotify commands such as play, next, and pause an audio track. A device manufacturer can provide a device-specific firmware including an audio driver that performs the operations of actually playing media the device, together with a wrapper that allows interaction to the audio driver such that, when the Spotify library is used to, e.g., pause playback of a particular song, that pause command is also communicated to the device's audio driver.

To ensure that a media device will operate as expected within a connected media environment, the testing of a particular media device under development should be performed on a finalized version and firmware of that particular device.

In accordance with an embodiment, the testing device can include a private key, which is compatible with the connected media environment, and which can be used with the firmware being tested in order to verify its authenticity to the emulated media server within the testing device. In this way, when the media device and its firmware is ultimately released to the public, no further changes are required to ensure the device's compatibility with the connected media environment.

Although a primary goal of the above-described technique is certification of a media device for use within a connected media environment, since the operation of each media device can be examined during its product development an additional benefit is that the system can also be used to find potential performance problems or bugs in the device's hardware or firmware, prior to final release to manufacture.

Figure 6:
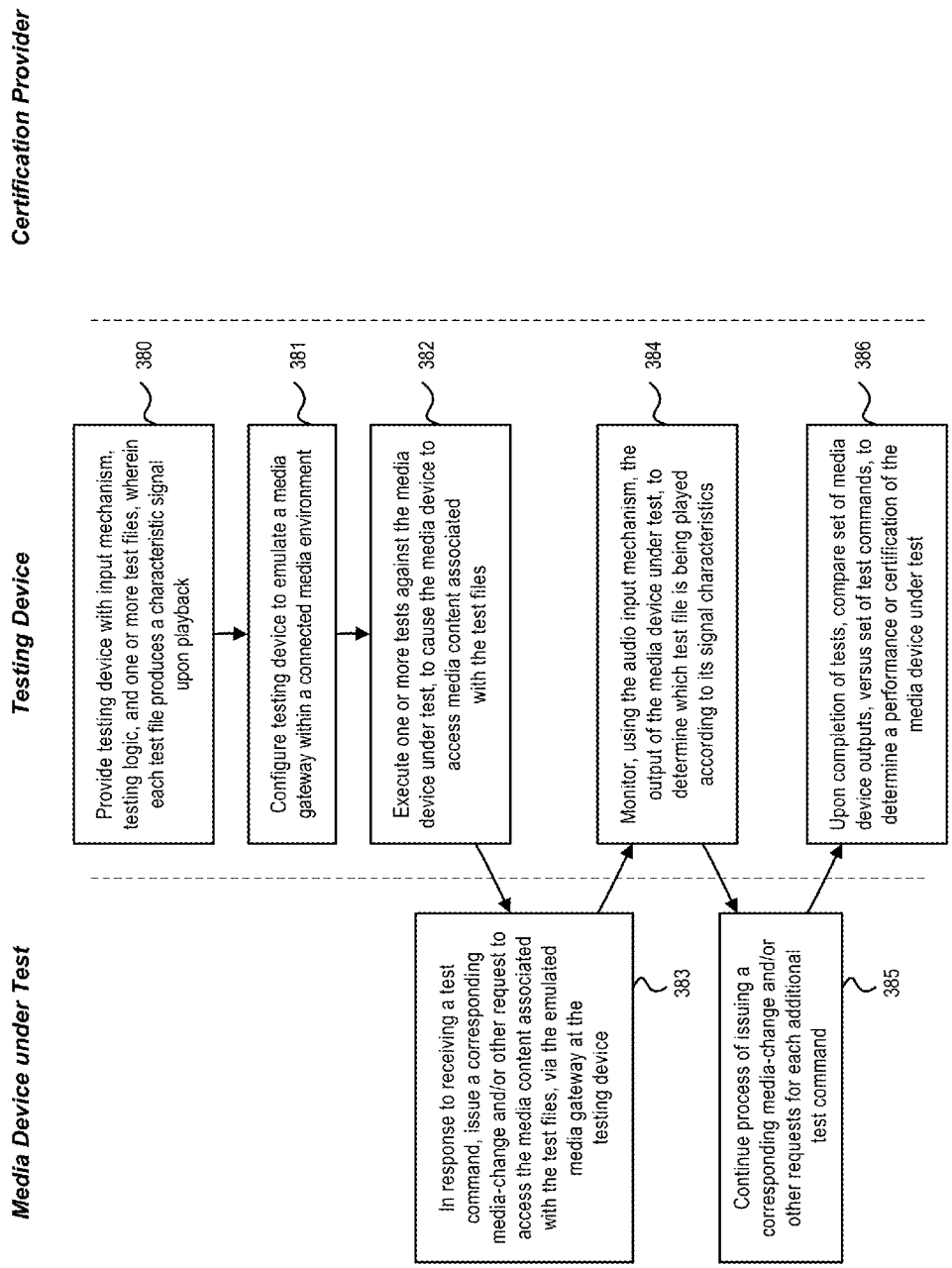
FIG. 6 is a flowchart that illustrates a method of testing and certifying media devices, in accordance with an embodiment.

FIG. 6 is a flowchart that illustrates a method of testing and certifying of media devices, in accordance with an embodiment.

As shown in FIG. 6, in accordance with an embodiment, at step 380, a testing device is provided with an audio input mechanism (for example, a microphone), testing logic, and one or more test files, wherein each test file can be used to produce a characteristic signal upon playback.

At step 381, the testing device is configured to emulate a media gateway within a connected media environment.

At step 382, one or more tests are executed against the media device under test, to cause the media device to access media content associated with the test files.

At step 383, in response to receiving a test command, a corresponding media-change and/or other request is issued by the media device under test, to access the media content associated with the test files, via the emulated media gateway at the testing device.

At step 384, the testing device monitors, using the audio input mechanism, the output of the media device under test, to determine which test file is being played according to its signal characteristics.

At step 385, the process of issuing a corresponding media-change and/or other requests is continued for each additional test command.

At step 386, upon completion of tests, the set of media device outputs, versus the set of test commands, is compared to determine a performance or certification of the media device under test.

Distributed Testing and Certification of Media Devices

In accordance with an embodiment, the system including the testing device can be made portable or distributable, so that it can be used in testing media devices, such as audio speakers at a remote site or location, and report testing results back to a central location, for example a certification provider. Such embodiments allow, e.g., a media device manufacturer, to perform detailed testing of their devices, in anticipation of certifying those devices for use within a connected media environment.

For example, as described above, in accordance with an embodiment, a testing device can be provided at a particular site, for use in testing media devices at that site, and reporting the results of such testing via a network to a remote location or certification provider, for remote testing and certification of the media devices.

Figure 7:
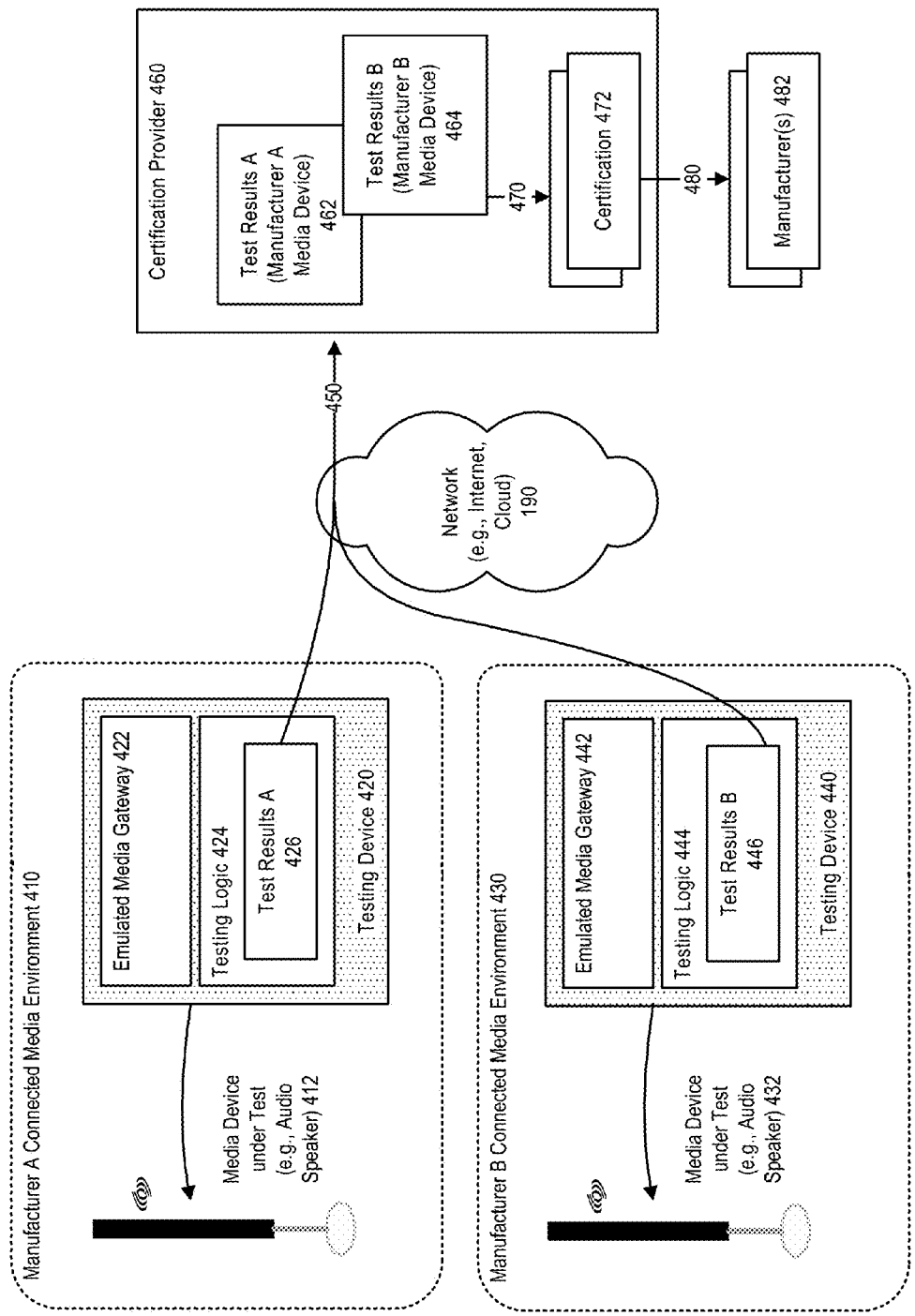
FIG. 7 illustrates a system for testing and certification of media devices, which can be used in a distributed testing environment, in accordance with an embodiment.

FIG. 7 illustrates a system for testing and certification of media devices, which can be used in a distributed testing environment, in accordance with an embodiment.

As shown in FIG. 7, in accordance with an embodiment, at each of a plurality of sites, for example at manufacturer environments A 410, B 430, which include one or more media devices under test (412, 432), a testing device 420, 440, including emulated media gateway 422, 442, and testing logic 424, 444, as described above, for use in testing the media devices at that site and preparing test results 426, 446.

In accordance with an embodiment, test results can then be communicated 450 to a certification provider 460, where the test results 462, 464 can be used to determine 470 a certification 472 for a media device under test.

As described above, the resultant information can also be used to create a report or scorecard describing the device's responsiveness to commands such as, e.g., start playing an audio track, skip to next track, change playback volume, etc.

The scorecard and/or certification can then be provided or otherwise associated with 480, the manufacturer 482, for use with the device.

As described above, to ensure that a media device will operate as expected within the environment, the testing of a particular media device under development should be performed on a finalized version and firmware of that particular device.

As further described above, in accordance with an embodiment, the testing device can include a private key, which is compatible with the connected media environment, and which can be used with the firmware being tested in order to verify their authenticity to the emulated media server within the testing device. In accordance with an embodiment, each manufacturer can be provided with keys that are specific to that manufacturer and its testing device, to further improve security, and to allow that manufacturer to operate their own emulated media server.

In a particular implementation, each manufacturer can receive from a certification provider a testing device in the form of a self-contained device which has an on/off or "test" switch, network connection, and microphone. The testing device can be positioned next to the device to be tested, connected to the network, and the test switch activated to initiate testing and return immediate results. The testing device can also be configured to upload information to a reporting server, or as described above may include an internal web server that allows access to stored results on the device.

Generally, a media device manufacturer can run tests in its device for an hour or so, until a level of confidence in test results is achieved. If a negative result is reached quickly then there is generally no need to continue running. Similarly if very positive results are reached quickly there may be less reason to continue testing, which allows longer testing periods to be preserved for threshold situations.

In accordance with other embodiments, testing devices can be used, for example with clusters of audio speakers. For example, in a clustered environment, one audio speaker may be configured as a master audio speaker, which communicates with a backend media server, while other audio speakers may be partner audio speakers which take their lead from the master server. In such an environment, the testing device can run tests over multiple audio speakers, for example to detect drifting of media content between those multiple devices.

In accordance with other embodiments, multi-room testing can be used to test multiple audio speakers at the same time with a common test script.

The particular details of providing communication between two or more clustered audio speakers, or within a multi-room environment can be left to the audio speaker implementation.

Figure 8:
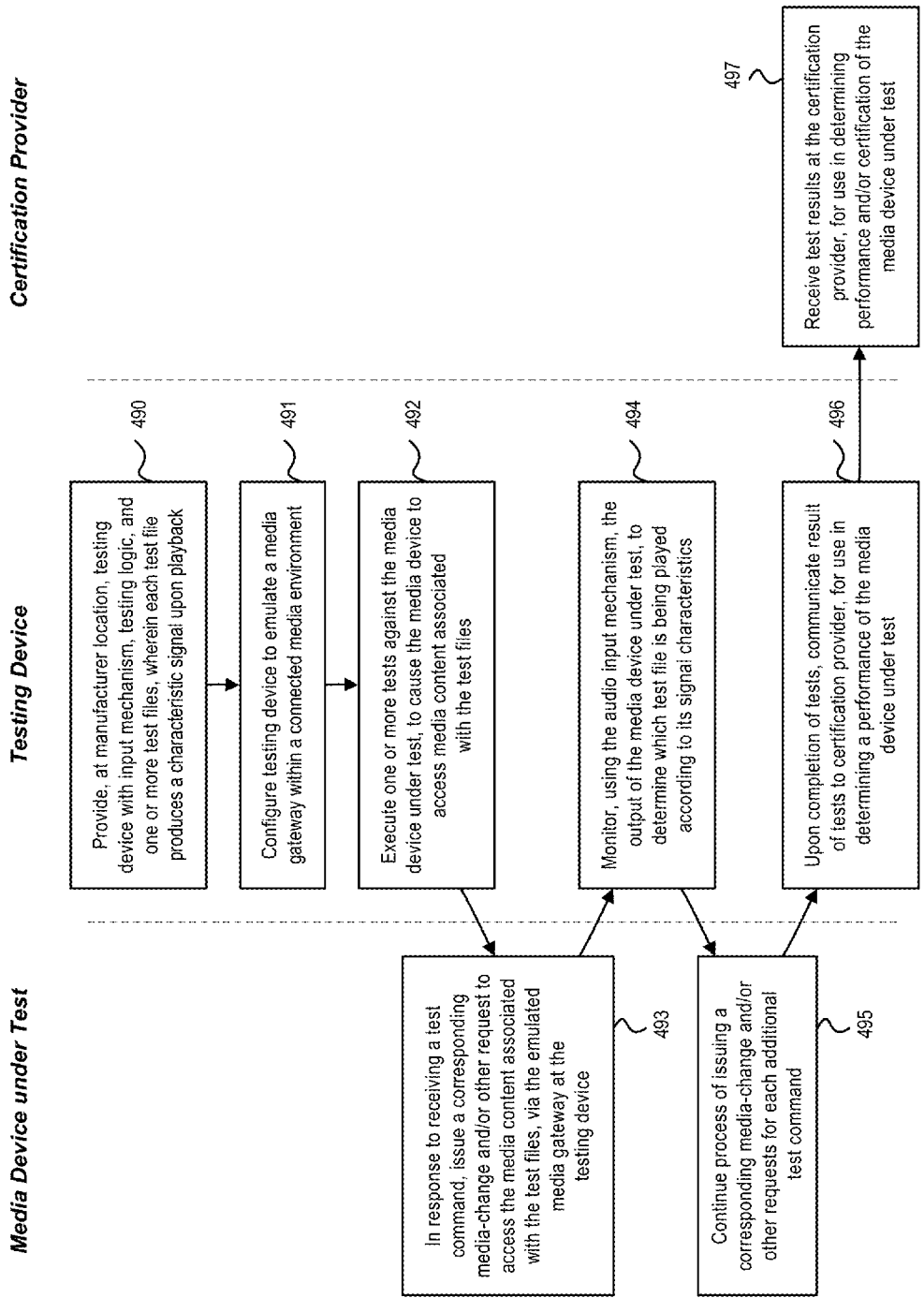
FIG. 8 is a flowchart that illustrates a method of testing and certifying media devices in a distributed testing environment, in accordance with an embodiment.

FIG. 8 is a flowchart that illustrates a method of testing and certifying media devices in a distributed testing environment, in accordance with an embodiment.

As shown in FIG. 8, in accordance with an embodiment, a method similar to that described above with respect to FIG. 6 can be used in a distributed testing environment, with a difference being that, at step 490, a testing device can be provided at a manufacturer location, together with an audio input mechanism, testing logic, and one or more test files, wherein each test file can be used to produce a characteristic signal upon playback.

Steps 491-495 can generally reflect those of steps 381-385 described above.

At step 496, upon completion of the tests, the test results are communicated to a certification provider (which may be, for example, the entity hosting the connected media environment), for use in determining a performance of the media device under test.

At step 497, the test results can be received at the certification provider, for use in determining performance and/or certification of the media device for use within the connected media environment.

Embodiments of the present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while several of the examples described above generally describe the use of a Spotify Connect environment and an audio speaker under test, the features and techniques described herein can be similarly used with other types of connected media environment and other types of media device.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for test and certification of audio speakers and other media devices for use within a connected media environment, comprising:
    a testing device, for use with a media device under test, the testing device including
        an input mechanism,
        a plurality of test files, wherein each test file can be used to produce a characteristic signal, and
        an emulated media gateway, which emulates a connected media environment including a media server;
    wherein the testing device is configured to perform tests that mimic commands to play or otherwise access media content at the media device under test, wherein the commands cause the media device under test to transmit one or more media access requests directed to the media server;
    wherein the emulated media gateway is configured to
        intercept the one or more media access requests transmitted by the media device under test and directed to the media server, and
        cause playback of one or more corresponding test files at the media device under test;
    wherein the testing device is configured to
        monitor an output of the media device under test,
        detect and recognize playback of the one or more corresponding test files according to the characteristic signal produced by each corresponding test file, and
        determine a responsiveness of the media device under test to the commands; and
    wherein resultant test information can be used to one or both evaluate the performance and certify operation of the media device under test for use within the connected media environment.

2. The system of claim 1, wherein the input mechanism is a microphone, and wherein each test file is used to produce playback of an audio track having a particular frequency.

3. The system of claim 2, wherein monitoring the output of the media device under test comprises recording, by the microphone, audio output from an audio speaker under test, and the testing device is further configured to provide the audio output to a frequency analyzer.

4. The system of claim 1, wherein the testing device comprises one or more test scripts, including test commands defined therein which, when executed by the media device under test, cause the media device under test to issue requests for the playback or other control of media content associated with the test files.

5. The system of claim 4, wherein the connected media environment is a music environment and the test commands comprise one or more of loading an audio track, pushing a playlist, starting playback, skipping to a next track, seeking within a track, changing a playback volume, pausing playback, and resuming from a paused playback.

6. The system of claim 4, wherein the resultant test information comprises a comparison of the output of the media device under test with a set of test commands used to test the media device under test.

7. The system of claim 1, wherein the testing device is provided at a particular site, for use in testing media devices at that site, and reporting the results of such testing locally.

8. The system of claim 1, wherein a testing device can be provided at a particular site, for use in testing media devices at that site, and reporting the results of such testing via a network to a remote location for remote testing and certification of the media devices.

9. The system of claim 1, wherein a first command comprises a command to play an audio track associated with a particular audio frequency, and a subsequent command comprises a command to click on a next audio track, and the testing device is configured to monitor for a changed output of the media device under test and to determine, as part of determining the responsiveness of the media device under test, whether there is a delay in playing the next audio track.

10. The system of claim 1, wherein the testing device comprises a private key that is compatible with the connected media environment, the private key for verifying the authenticity of the media device under test to the emulated media gateway.

11. A method of testing and providing certification of audio speakers and other media devices for use within a connected media environment, comprising:

accessing, at a testing device for use with a media device under test, a plurality of test files, wherein each test file can be used to produce a characteristic signal, and wherein the testing device includes an input mechanism;

executing an emulated media gateway, which emulates a connected media environment including a media server;

executing, by the testing device, tests to mimic commands to play or otherwise access media content at the media device under test, wherein the commands cause the media device under test to transmit one or more media access requests directed to the media server;

intercepting, via the emulated media gateway, the one or more media access requests transmitted by the media device under test and directed to the media server;

causing, via the emulated media gateway, playback of one or more corresponding test files at the media device under test;

monitoring, by the testing device, an output of the media device under test;

detecting and recognizing, by the testing device, playback of the one or more corresponding test files according to the characteristic signal produced by each corresponding test file;

determining, by the testing device, a responsiveness of the media device under test to the commands; and using resultant test information to one or both evaluate the performance and certify operation of the media device under test within the connected media environment.

12. The method of claim 11, wherein the input mechanism is a microphone, and wherein each test file is used to produce playback of an audio track having a particular frequency.

13. The method of claim 12, wherein monitoring the output of the media device under test comprises recording, by the microphone, audio output from an audio speaker under test, and the method further comprises providing the audio output to a frequency analyzer.

14. The method of claim 11, wherein the testing device comprises one or more test scripts, including test commands defined therein which, when executed by the media device under test, cause the media device under test to issue requests for the playback or other control of media content associated with the test files.

15. The method of claim 14, wherein using the resultant test information comprises comparing the output of the media device under test with a set of test commands used to test the media device under test.

16. The method of claim 11, wherein the testing device is provided at a particular site, for use in testing media devices at that site, and reporting the results of such testing locally.

17. The method of claim 11, wherein a testing device can be provided at a particular site, for use in testing media devices at that site, and reporting the results of such testing via a network to a remote location for remote testing and certification of the media devices.

18. The method of claim 14, wherein the connected media environment is a music environment and the test commands comprise one or more of loading an audio track, pushing a playlist, starting playback, skipping to a next track, seeking within a track, changing a playback volume, pausing playback, and resuming from a paused playback.

19. The method of claim 11, wherein:

a first command comprises a command to play an audio track associated with a particular audio frequency, and a subsequent command comprises a command to click on a next audio track, monitoring the output of the media device under test comprises monitoring for a changed output of the media device under test, and determining the responsiveness of the media device under test comprises determining whether there is a delay in playing the next audio track.

20. The method of claim 11, wherein the testing device comprises a private key that is compatible with the connected media environment, the private key for verifying the authenticity of the media device under test to the emulated media gateway.

* * * * *